(12) United States Patent
Yoshimura et al.

(10) Patent No.: US 7,164,213 B2
(45) Date of Patent: Jan. 16, 2007

(54) THEFT PREVENTION SYSTEM FOR MOTOR VEHICLES

(75) Inventors: Kentaro Yoshimura, Utsunomiya (JP); Tomoo Watanabe, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/368,530

(22) Filed: Mar. 7, 2006

(65) Prior Publication Data

US 2006/0197381 A1 Sep. 7, 2006

(30) Foreign Application Priority Data

Mar. 7, 2005 (JP) .............................. 2005-062119

(51) Int. Cl.
*B60R 25/00* (2006.01)
*G05B 19/00* (2006.01)
*G05B 13/00* (2006.01)
*G08B 29/00* (2006.01)

(52) U.S. Cl. ............ 307/10.2; 307/10.1; 340/5.1; 340/5.22; 340/5.23; 340/5.24; 340/5.25

(58) Field of Classification Search ............ 307/10.1, 307/10.2; 340/5.1, 5.22, 5.23, 5.24; 370/5.25
See application file for complete search history.

(56) References Cited

U.S. PATENT DOCUMENTS 5,563,600 A * 10/1996 Miyake ..................... 341/173
5,995,013 A 11/1999 Yoshizawa et al.
6,297,567 B1 * 10/2001 Yano ......................... 307/10.3
6,512,461 B1 * 1/2003 Benzie et al. ............ 340/825.22
2003/0222757 A1 12/2003 Ghabra et al.
2004/0262068 A1 * 12/2004 Matsubara et al. ......... 180/287
2006/0082435 A1 * 4/2006 Matsumoto et al. ....... 340/5.23

FOREIGN PATENT DOCUMENTS

EP 0 870 889 A2 10/1998
EP 1 367 543 A2 12/2003
JP 2000-108848 A 4/2000

* cited by examiner

*Primary Examiner*—Anatoly Vortman
*Assistant Examiner*—Michael Rutland-Wallis
(74) *Attorney, Agent, or Firm*—Arent Fox PLLC

(57) ABSTRACT

For registering or updating the information of second identification codes stored in a theft prevention apparatus when the theft prevention apparatus is replaced, a third identification code sent from a third apparatus which is mounted in a motor vehicle is checked against a third identification code stored in the theft prevention apparatus, and must be identical thereto. Even if a third party prepares and installs an ignition key and a theft prevention apparatus of its own on the motor vehicle, the third identification code is not verified, and hence the information of second identification codes cannot be equalized.

5 Claims, 10 Drawing Sheets

CODE VERIFICATION IN THEFT PREVENTION APPARATUS (1/2)

CODE VERIFICATION IN ENGINE CONTROL APPARATUS

THEFT PREVENTION SYSTEM FOR MOTOR VEHICLES

BACKGROUND OF THE INVENTION

1. Field of the Invention

The present invention relates to a theft prevention system having a theft prevention apparatus for checking a first identification code transmitted from a portable unit such as an ignition key, a remote control key, or the like, and transmitting a second identification code through a communication line to an engine control apparatus, and an engine control apparatus for checking the second identification code transmitted through the communication line from the theft prevention apparatus and controlling the startup of an engine based on the checked second identification code.

2. Description of the Related Art

There has been known a theft prevention system, also referred to as an immobilizer system, for preventing a motor vehicle from being stolen by an unauthorized action to start the engine mounted on the motor vehicle. The theft prevention system allows the engine to be started when an ID code (referred to as a key ID code or a first identification code) is checked through communications with an ignition key incorporating a communication unit.

The theft prevention system has a theft prevention apparatus (also referred to as an immobilizer unit or an immobilizer ECU) for communicating with a key and checking a first identification code transmitted from the key, and an engine control apparatus (also referred to as an engine control module or an engine ECU) for communicating with the theft prevention apparatus and controlling the startup of the engine.

If the first identification code transmitted from the key is not checked, then the key is judged as being not a legitimate key, and the engine control apparatus cuts off the supply of fuel to the engine and prevents an igniter from igniting the fuel, thereby inhibiting the startup of the engine and hence preventing the motor vehicle from being stolen.

To prevent the engine control apparatus from permitting the engine to start easily when the theft prevention apparatus is removed from the motor vehicle, a communicating and checking process is performed between the theft prevention apparatus and the engine control apparatus, using an ID code (second identification code) which is different from the first identification code.

If the theft prevention apparatus or the engine control apparatus is replaced with a new one, then it is necessary to equalize second identification codes that are used between them.

Heretofore, when the theft prevention apparatus or the engine control apparatus is replaced with a new one, it has been customary to register a second identification code in the theft prevention apparatus or the engine control apparatus, using a dedicated tester.

However, the use has found the registering process inconvenient because the registering process can only be performed at a car dealer having a repair shop which owns the dedicated tester.

To improve convenience for users, Japanese laid-open patent publication No. 2000-108848 discloses a process of equalizing second identification codes in two ECUs, i.e., a theft prevention apparatus and an engine control apparatus, when special conditions are satisfied, e.g., a registering dedicated switch on the engine control apparatus is turned on, an ignition switch is turned on, an engine rotational speed is 0 rpm, and a vehicle speed is 0 km/h continuously for a given period of time, e.g., about 30 minutes. The disclosed process allows the user to perform the registering process simply and reliably without the need to go to a dealer owing a dedicated tester.

According to the disclosed process, however, a malicious third party may possibly prepare a portable unit and a theft prevention apparatus, whose first identification codes are identical to each other, and install the theft prevention apparatus on a motor vehicle, and make an action to satisfy the above conditions to steal the motor vehicle.

In addition, the disclosed process is still inconvenient in that even an authorized person cannot complete the registering and updating process before the above given period of time elapses.

SUMMARY OF THE INVENTION

It is therefore an object of the present invention to provide a theft prevention system for motor vehicles which allows an authorized person to rewrite a second identification code simply and reliably and makes it difficult for a malicious third party to rewrite a second identification code for improved theft prevention capability.

According to the present invention, there is provided a theft prevention system for a motor vehicle, comprising a theft prevention apparatus connected through a wireless link to a portable unit storing a first identification code, and storing first, second, and third identification codes, an engine control apparatus connected to the theft prevention apparatus through a communication line and storing a second identification code, and a third apparatus connected to the theft prevention apparatus through the communication line and storing a third identification code, the theft prevention apparatus comprising permitting means for checking the first identification code sent from the portable unit, checking the third identification code received from the third apparatus through the communication line, and permitting the theft prevention apparatus or the engine control apparatus to register or update the second identification code based on checked results over the first identification code and the third identification code, and equalizing means for equalizing information of the second identification codes stored in the theft prevention apparatus and the engine control apparatus when the permitting means permits the theft prevention apparatus or the engine control apparatus to register or update the second identification code.

For registering or updating the information of second identification codes stored in the theft prevention apparatus and the engine control apparatus when the theft prevention apparatus or the engine control apparatus is replaced, the third identification code sent from the third apparatus which is mounted in the motor vehicle and connected to the theft prevention apparatus through the communication line must be identical to the third identification code stored in the theft prevention apparatus. Even if a third party prepares a portable unit and a theft prevention apparatus of its own and install the theft prevention apparatus on the motor vehicle, the third identification code is not verified, and hence the information of second identification codes cannot be equalized. The motor vehicle is thus made highly resistant to being stolen. When an authorized party wants to equalize the information of the second identification codes, the authorized party does not need to wait for a long period of time until the information can be equalized. The theft prevention system is thus highly convenient to use.

The theft prevention system may further comprise detecting means disposed in a vehicle cabin of the motor vehicle for detecting an input action made on a manually operable operation unit, and the permitting means may permit the theft prevention apparatus or the engine control apparatus to register or update the second identification code based on a detected result from the detecting means if the first identification code and the third identification code are verified.

For registering or updating the information of the second identification code, it is necessary to make an input action on the operation unit in the vehicle cabin, as an additional requirement. Consequently, the motor vehicle is prevented from being stolen by a third party who is not aware of such an input action.

The manually operable operation unit may comprise a parking brake or a brake pedal of the motor vehicle, and the detecting means may comprise a switch which is turned on when the parking brake is applied or the brake pedal is depressed. With a brake applying action as an input action, the motor vehicle is highly resistant to being stolen as it cannot be moved when the input action is made.

The third apparatus may be disposed in a location in the motor vehicle from which the third apparatus is hardly removable. The location may be a space behind a meter unit mounted in a dashboard, i.e., a space that cannot be accessed from which the third apparatus is hardly removable unless a meter panel and the meter unit are removed, or a position from which the third apparatus is not removable unless a fuse box cover and a harness integrally mounted in a fuse box are removed. Consequently, the third apparatus mounted in the above location is considerably difficult to remove, is time-consuming to remove, and is further time-consuming to reinstall after being removed. Thus, the third apparatus makes the motor vehicle highly resistant to being stolen. An authorized person does not need to remove the third apparatus, and the third apparatus is essentially free of failures as it comprises a memory.

According to the present invention, for registering or updating the information of second identification codes stored in the theft prevention apparatus and the engine control apparatus when the theft prevention apparatus or the engine control apparatus is replaced, the third identification code sent from the third apparatus which is mounted in the motor vehicle and connected to the theft prevention apparatus through the communication line must be identical to the third identification code stored in the theft prevention apparatus. Even if a third party prepares a portable unit and a theft prevention apparatus of its own and install the theft prevention apparatus on the motor vehicle, the third identification code is not verified, and hence the information of second identification codes cannot be equalized. The motor vehicle is thus made highly resistant to being stolen.

As described above, for registering or updating the information of second identification codes, it is necessary that the third identification code sent from the third apparatus be verified. Therefore, even if a third party prepares and install a portable unit and a theft prevention apparatus of its own on the motor vehicle, the information of second identification codes cannot be equalized. The motor vehicle is thus made highly resistant to being stolen.

When an authorized party wants to equalize the information of the second identification codes, the authorized party does not need to wait for a long period of time until the information can be equalized. The theft prevention system is thus highly convenient to use.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
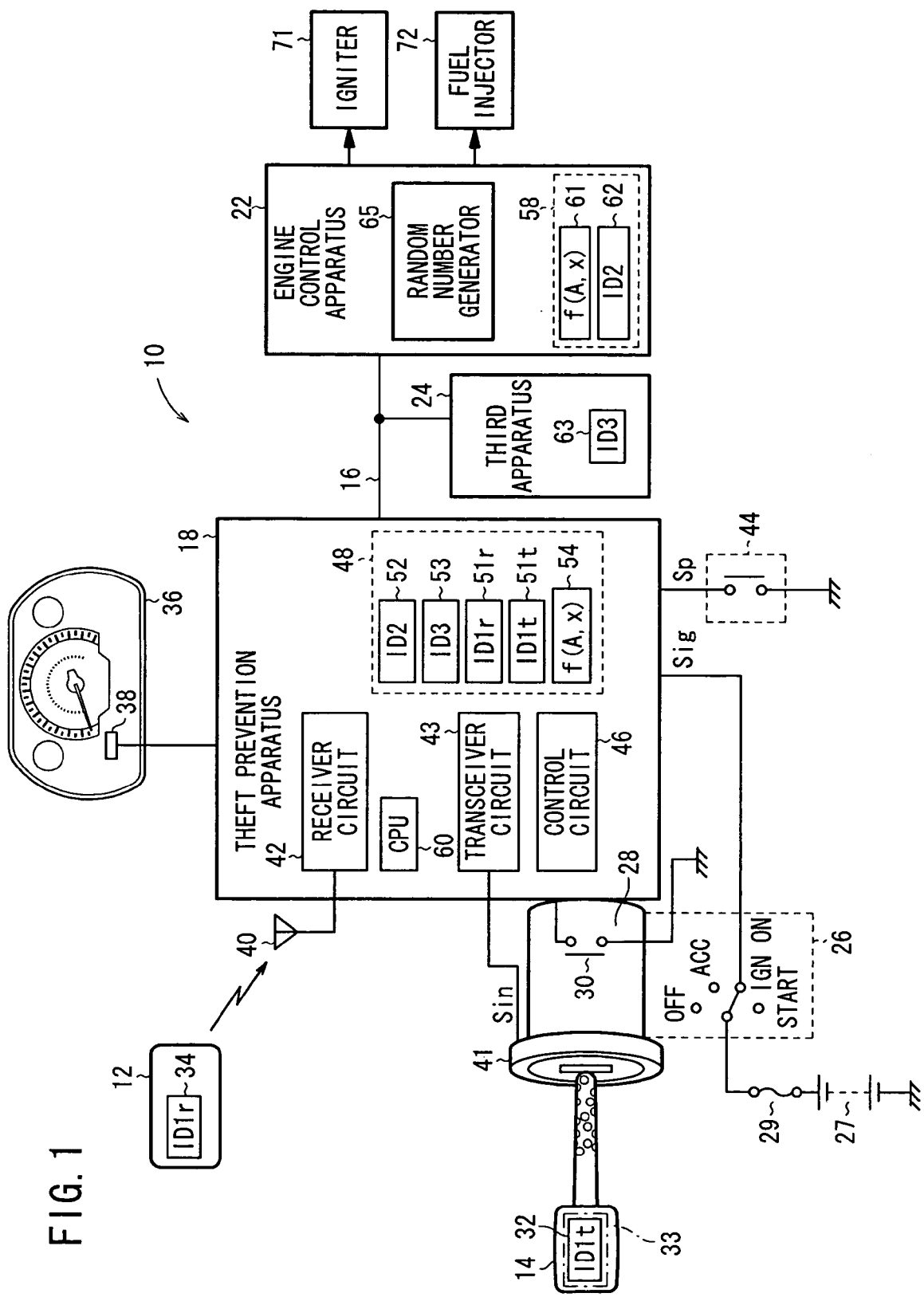
FIG. 1 is a block diagram of a theft prevention system for motor vehicles according to an embodiment of the present invention.

FIG. 1 shows in block form a theft prevention system 10 for motor vehicles according to an embodiment of the present invention.

As shown in FIG. 1, the theft prevention system 10 basically comprises a portable unit, e.g., a remote control key 12 or an ignition key 14, an operation switch (detecting means) 44, a theft prevention apparatus 18, an engine control apparatus 22, and a third apparatus 24.

The remote control key 12 is for keyless entry and is carried by the operator (user). The ignition key 14 which also functions as a transponder is also carried by the operator. The remote control key 12 and the ignition key 14 are verification devices that can be taken away from the motor vehicle, and are capable of performing wireless communications.

The theft prevention apparatus 18, the engine control apparatus 22 which controls the engine on the motor vehicle, and the third apparatus 24 are connected to each other by a single communication line 16 installed in the motor vehicle.

The theft prevention apparatus 18 is supplied with an ignition switch signal Sig from an ignition switch 26 that can selectively be turned to an off (OFF) position, an accessory (ACC) position, an ignition-on (IGN ON) position, and a start (START) position. The ignition switch signal Sig is in the ON state when the ignition switch 26 is in the ignition-on position, and is in the OFF state when the ignition switch 26 is in either one of the other positions.

The ignition switch 26 is actually integrally combined with a key cylinder 28. When the blade of the ignition key 14 is inserted into the key cylinder 28 and the ignition key 14 is turned by the operator, the ignition switch 26 is turned to one of the positions referred to above. The key cylinder 28 has a key insertion detecting switch 30. When the blade of the ignition key 14 is inserted into the key cylinder 28, the key insertion detecting switch 30 supplies a key insertion detecting signal Sin which is in the ON state, i.e., at the ground level as shown in FIG. 1, to the theft prevention apparatus 18.

The ignition key 14 has a grip to be gripped and turned by the operator, the grip being connected to the blade. The grip incorporates therein a transponder 33 having a power supply (not shown), a transceiver (not shown), and a memory 32 such as an EEPROM or the like for storing a first identification code ID1t.

The remote control key 12 incorporates therein a power supply (not shown), a transmitter (not shown), and a memory 34 such as an EEPROM or the like for storing a first identification code ID1r.

The theft prevention apparatus 18 has an antenna 40 and a receiver circuit 42 for receiving signals including the first identification code ID1r from the remote control key 12.

The theft prevention apparatus 18 also has a coil antenna 41 and a transceiver circuit 43 for supplying electric power in the form of a trigger signal to the transponder 33 and receiving signals including the first identification code ID1t that is read from the memory 34 by the transponder 33. The theft prevention apparatus 18 is supplied with a detected signal Sp from the operation switch 44. The operation switch 44 serves as a detecting means which is turned on, i.e., at the ground level as shown in FIG. 1, when the user makes an input action to operate a parking brake which is disposed in a vehicle cabin of the motor vehicle as a manually operable predetermined operation unit.

If an action to stop the motor vehicle is to be detected, then the predetermined operation unit is not limited to the parking brake, but may be an operation switch that is turned on when the operator depresses the brake pedal. Alternatively, the detected signal Sp may be supplied from both the operation switch 44 associated with the parking brake and the operation switch of the brake pedal. Stated otherwise, the input action of the predetermined operation unit may not be made unless detected signals Sp from both the operation switch 44 associated with the parking brake and the operation switch of the brake pedal are turned on.

In the present embodiment, the input action of the predetermined operation unit represents a predetermined operating sequence of the predetermined operation unit. The predetermined operating sequence refers to a predetermined pattern which is analogous to the Morse code and represents a predetermined sequence of time intervals at which the predetermined operation unit is turned on and off.

The theft prevention apparatus 18 has a control circuit 46 for sending signals to and receiving signals from the ignition key 14 inserted in the key cylinder 28 and also for controlling the key insertion detecting signal Sin, the ignition switch signal Sig, the detected signal Sp, and signals sent and received through the communication line 16.

The theft prevention apparatus 18 also has a memory 48 such as an EEPROM or the like storing four identification codes. Specifically, the memory 48 has storage areas 51t, 51r, 52, 53 storing a first identification code ID1t, a first identification code ID1r, a second identification code ID2, and a third identification code ID3.

The memory 48 also has a storage area 54 storing the second identification code ID2 that is stored in the storage area 52 and a function (verification code generating function) f(A,x) for generating a verification code (checking code) using variables that are represented respectively by the second identification code ID2 stored in the storage area 52 and a random code R that is received from the engine control apparatus 22 through the communication line 16. In the verification code generating function f(A,x), the second identification code ID2 is assigned to the variable A, and the random code R is assigned to the variable x.

The memory 48 further had a storage area (not shown) storing the predetermined pattern representing the predetermined sequence for operating the predetermined operation unit based on the detected signal Sp.

The theft prevention apparatus 18 has a CPU 60 for executing a program stored in a ROM (not shown) to control the theft prevention apparatus 18 in its entirety and also control the theft prevention apparatus 18 to communicate with the engine control apparatus 22 and the third apparatus 24.

The engine control apparatus 22 has a CPU (not shown), a memory 58 such as an EEPROM or the like, and a random number generator 65 for generating the random code R comprising a random number code.

The memory 58 has a storage area 62 storing the second identification code ID2. The memory 58 also has a storage area 61 storing a function (verification code generating function) f(A,x) for generating a verification code (checking code) using variables that are represented respectively by the second identification code ID2 stored in the storage area 62 and the random code R that is generated by the random number generator 65. In the verification code generating function f(A,x), the second identification code ID2 is assigned to the variable A, and the random code R is assigned to the variable x. The verification code generating functions f(A,x) stored respectively in the engine control apparatus 22 and the theft prevention apparatus 18 are identical to each other.

The engine control apparatus 22 also has a CPU for executing a program stored in a ROM (not shown) to control a fuel injector 72 and an igniter 71 to supply fuel to the engine and ignite the fuel in the engine.

On the condition that the first identification code ID1t is successfully checked between the theft prevention apparatus 18 and the ignition key 14 (the transponder 33), the theft prevention apparatus 18 and the engine control apparatus 22 exchange predetermined codes therebetween. When the codes are exchanged successfully, or stated otherwise, when the function values f(ID2,R) of the verification code generating functions f(A,x) based on the second verification codes ID2 agree with each other, the engine control apparatus 22 permits the fuel injector 72 to inject fuel into the engine and also permits the igniter 71 to ignite the fuel in the engine, allowing the engine to be started.

The third apparatus 24, which serves as a memory apparatus, has a memory 63 such as an EEPROM or the like, storing the third identification code ID3.

The third apparatus 24 is mounted in the motor vehicle at a location where the third apparatus 24 cannot easily be removed from the motor vehicle.

Figure 2:
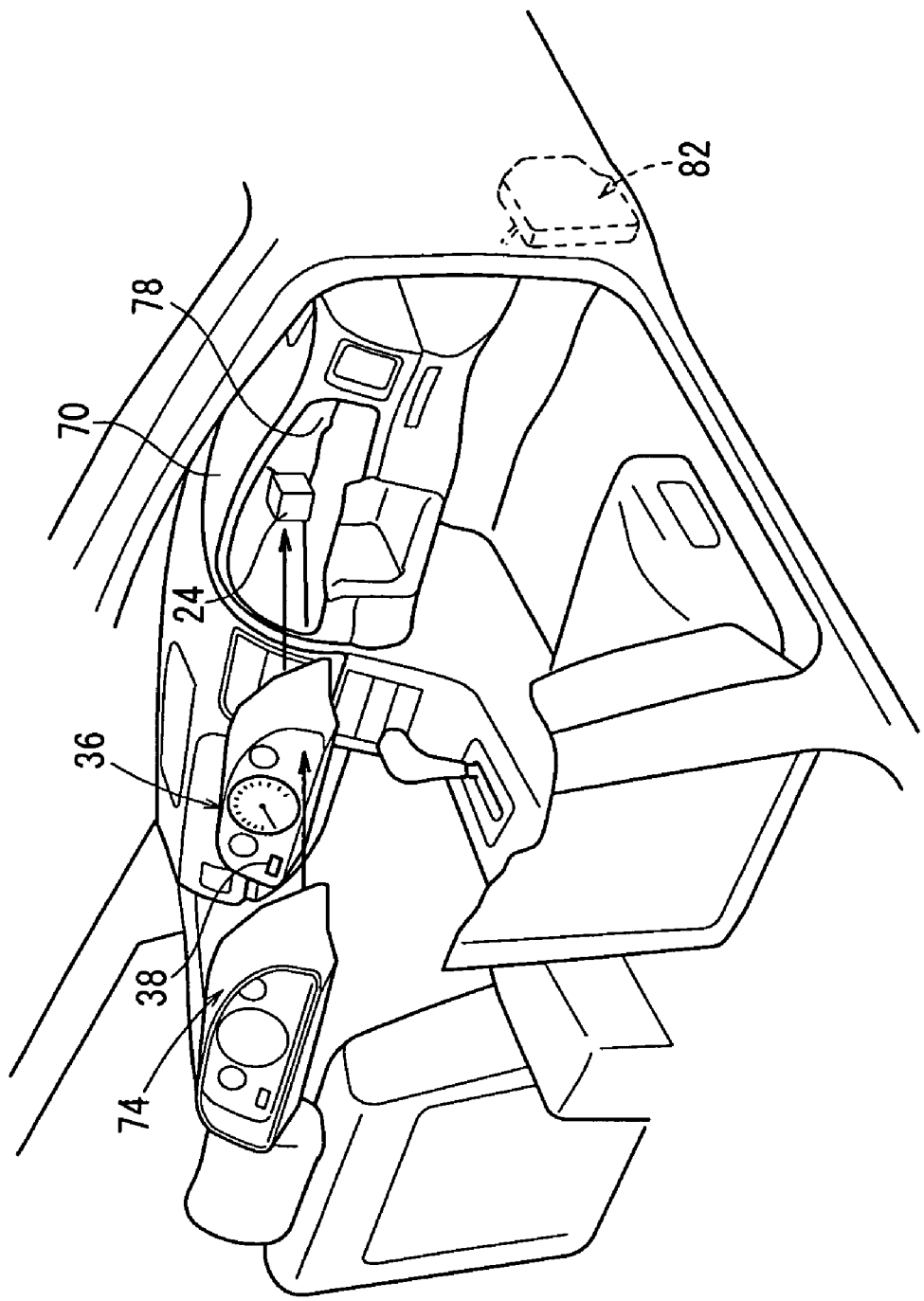
FIG. 2 is a fragmentary perspective view showing an installation position for a third apparatus.
Figure 3:
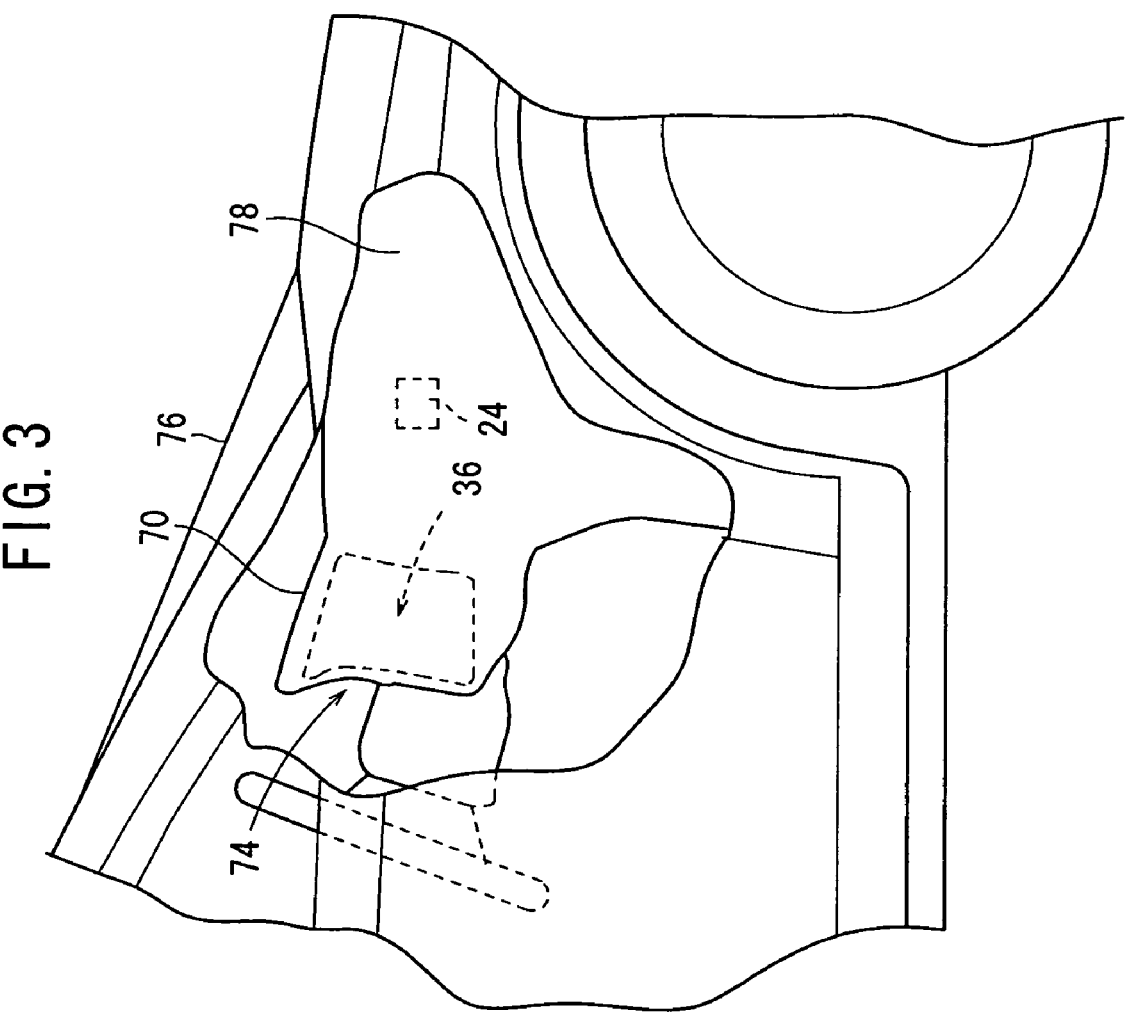
FIG. 3 is a fragmentary side elevational view showing the installation position for the third apparatus.
Figure 4:
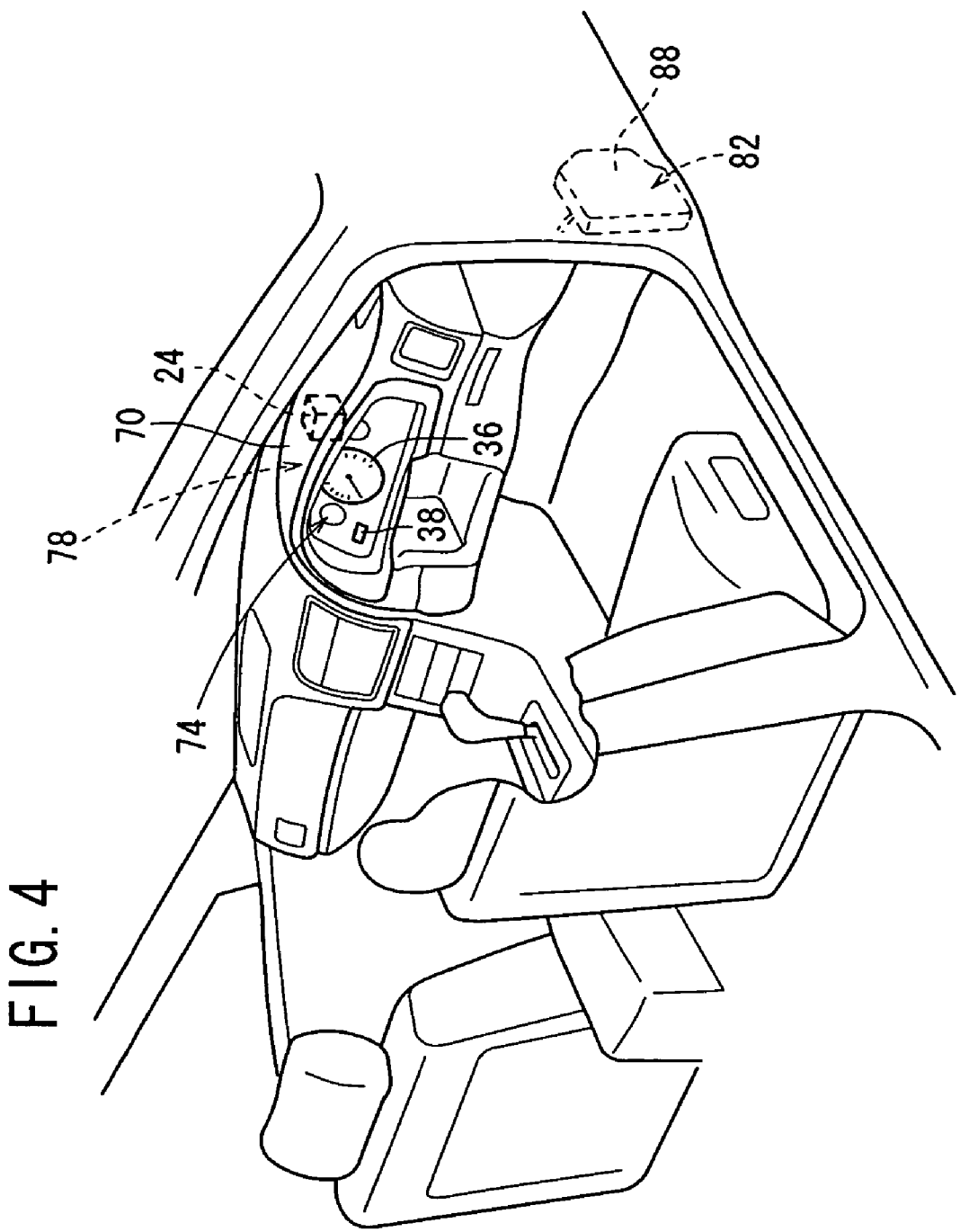
FIG. 4 is a fragmentary perspective view showing the installation position for the third apparatus.

Specifically, as shown in FIGS. 2 through 4, such a location should preferably be a space behind a meter unit 36 mounted in a dashboard 70, i.e., a space 78 that cannot be accessed unless a meter panel 74 and the meter unit 36 are removed and that is positioned inside of a front windshield 76 (see FIG. 3). The third apparatus 24 is mounted in the space 78 from which the third apparatus 24 is hardly removable.

Figure 5:
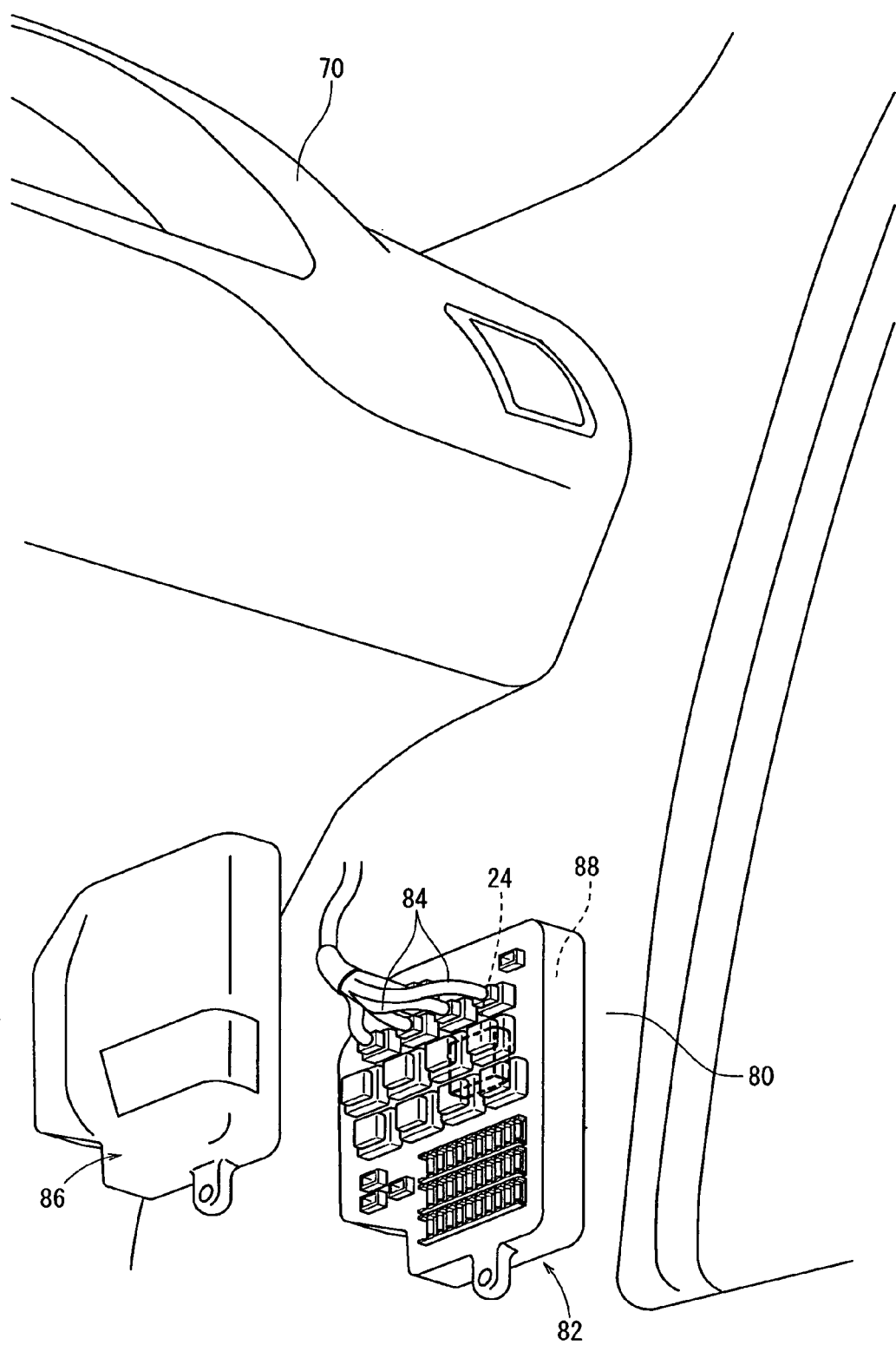
FIG. 5 is a fragmentary perspective view showing another installation position for a third apparatus.

Alternatively, as shown in FIGS. 2, 4, and 5, the third apparatus 24 may be integrally mounted in a fuse box 82 fastened by screws to a body 80 (see FIG. 5) of the motor vehicle, and positioned in a space 88 from which the third apparatus 24 is removable unless a fuse box cover 86 and a harness 84 of electric wires are removed.

The meter unit 36 assembled in the dashboard 70 has a display lamp 38 connected to the theft prevention apparatus 18. The display lamp 38 displays a state in which the second identification code ID2 stored in the storage area 52 of the theft prevention apparatus 18 has been registered or updated normally (normal registration/updating) or a state the second identification code ID2 stored in the storage area 52 of the memory 48 of the theft prevention apparatus 18 has been registered or updated abnormally (abnormal registration/updating).

The EEPROMs of the above memories may be replaced with flash memories.

The theft prevention system 10 according to the present embodiment is basically constructed as described above. Operation of the theft prevention system 10 will be described below with reference to FIGS. 6 through 10.

First, a process of registering or updating the second identification code ID2 stored in the storage area 52 of the memory 48 of the theft prevention apparatus 18 will be described below with reference to FIG. 6.

The process of registering or updating the second identification code ID2 stored in the storage area 52 of the memory 48 of the theft prevention apparatus 18 serves to increase the theft prevention capability of the motor vehicle if the remote control key 12, the ignition key 14, and the theft prevention apparatus 18 are replaced by a malicious third party.

Figure 6:
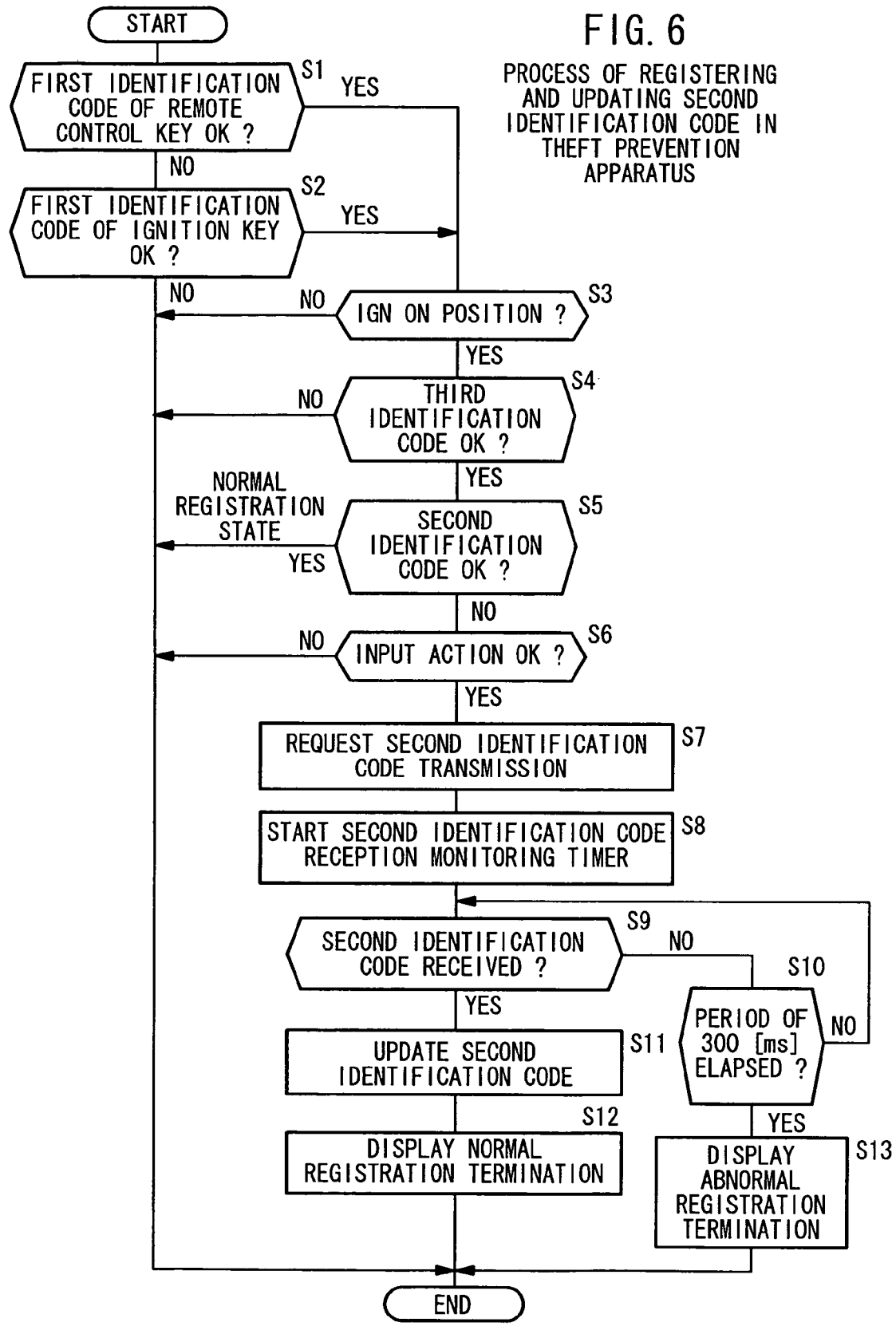
FIG. 6 is a flowchart of a process of registering or updating a second identification code in a theft prevention apparatus.

In step S1 shown in FIG. 6, the remote control key 12 is verified. Specifically, the CPU 60 of the theft prevention apparatus 18 receives the first identification code ID1$r$ read and transmitted from the memory 34 of the remote control key 12, through the antenna 40 and the receiver circuit 42. The CPU 60 then checks the received first identification code ID1$r$ against the first identification code ID1$r$ read from the storage area 51$r$ of the memory 48.

In step S2, the ignition key 14 is verified. Specifically, when the ignition key 14 is inserted into the key cylinder 28, the CPU 60 detects that the key insertion detecting signal Sin from the key insertion detecting switch 30 is in the ON state. At this time, the CPU 60 sends a trigger signal to the ignition key 14 through the transceiver circuit 43 and the coil antenna 41. In response to the trigger signal, the transponder 33 of the ignition key 14 sends the first identification code IDt read from its own memory 32 to the theft prevention apparatus 18. The CPU 60 checks the received first identification code ID1$t$ against the first identification code ID1$t$ read from the storage area 51$t$ of the memory 48.

If the first identification codes are checked successfully (checked results are OK) in steps S1, S2, i.e., if first identification codes ID1$r$ stored in the remote control key 12 and the theft prevention apparatus 18 are identical to each other, or if first identification codes ID1$t$ stored in the ignition key 14 and the theft prevention apparatus 18 are identical to each other, then the CPU 60 determines in step S3 whether the ignition switch 26 has switched to the ignition-on position or not, based on the ignition switch signal Sig.

If the ignition switch 26 has switched to the ignition-on position, then the CPU 60 reads the third identification code ID3 from the memory 63 of the third apparatus 24 through the communication line 16, and checks the read third identification code ID3 against the third identification code ID3 read from the storage area 53 of the memory 48 in step S4. When the ignition switch 26 has switched to the ignition-on position, electric power is supplied from a battery 27 to the engine control apparatus 22.

If the third identification codes are checked successfully (checked results are OK) in step S4, i.e., if the third identification codes ID3 stored in the theft prevention apparatus 18 and the third apparatus 24 are identical to each other, the CPU 60 checks the second identification code ID2 in step S5.

In step S5, the CPU 60 requests the engine control apparatus 22 to transmit the random code R through the communication line 16. In response to the request, the engine control apparatus 22 operates the random number generator 65 to generate the random code R and sends the generated random code R to the theft prevention apparatus 18 through the communication line 16. When the CPU 60 of the theft prevention apparatus 18 receives the random code R, the CPU 60 assigns the received random code R and the second identification code ID2 read from the storage area 52 of the memory 48 to the verification code generating function f(A,x) stored in the storage area 54, producing a function value (calculated result) V {V=f(ID2,R)}. The CPU 60 sends the calculated result V from the theft prevention apparatus 18 through the communication line 16 to the engine control apparatus 22. The engine control apparatus 22 assigns the random code R generated and transmitted thereby and the second identification code ID2 read from the storage area 62 of the memory 58 to the verification code generating function f(A,x), producing a function value (calculated result) V {V=f(ID2,R)}. The engine control apparatus 22 then checks the calculated result V against the calculated result V received from the theft prevention apparatus 18 through the communication line 16. Thereafter, the engine control apparatus 22 sends a checked result (OR or NG) to the theft prevention apparatus 18. If the checked result is OK, then it means that the second identification codes ID2 stored in the storage area 52 of the memory 48 of the theft prevention apparatus 18 and the second identification codes ID2 stored in the storage area 62 of the memory 58 of the engine control apparatus 22 are identical to each other. Therefore, the second identification codes ID2 are checked successfully (the checked result is OK).

With the same verification code generating functions f(A,x) being stored in the theft prevention apparatus 18 and the engine control apparatus 22, the second identification code ID2 is not transmitted through the communication line 16 in step S5 for checking the second identification code ID2. Therefore, the theft prevention system has an excellent theft prevention capability. If the second identification code ID2 is checked successfully in step S5 when the first identification codes are checked successfully, then the second identification code ID2 is judged as being registered normally, and does not need to be registered again. The process of registering or updating the second identification code ID2 as shown in FIG. 6 is now put to an end.

If the engine control apparatus 22 is replaced, or stated otherwise, if the calculated results V are not identical to each other, then the CPU 60 judges that the second identification codes ID2 are not identical to each other, based on receipt of the checked result (NG). In order to register or update the second identification code ID2 in the theft prevention apparatus 18, the CPU 60 determines in step S6 whether a predetermined input action is made on the parking brake or not, i.e., whether a predetermined pattern is input or not, based on the detected signal Sp from the operation switch 44 as an additional requirement.

If the predetermined pattern is input and hence the predetermined input action is made in step S6, then the CPU 60 requests the engine control apparatus 22 to transmit the second identification code ID2 through the communication line 16 in step S7.

The request to transmit the second identification code ID2 is output only after the third identification code ID3 is checked successfully in step S4 and the predetermined input action is made as the additional requirement in step S6. Therefore, the theft prevention capability of the theft prevention system is further increased.

After the CPU 60 has requested the engine control apparatus 22 to transmit the second identification code ID2, the CPU 60 starts to activate a second identification code reception monitoring timer for a predetermined period of 300 ms in step S8.

If the engine control apparatus 22 receives the request to transmit the second identification code ID2 from the CPU 60 of the theft prevention apparatus 18, then the engine control apparatus 22 reads the second identification code ID2 from the storage area 62 of the memory 58, and sends the read second identification code ID2 to the theft prevention apparatus 18 through the communication line 16.

In step S9, the theft prevention apparatus 18 determines whether it has received the second identification code ID2 through the communication line 16 or not.

If the theft prevention apparatus 18 has received the second identification code ID2 within the period of 300 ms, the CPU 60 rewrites (updates) the data stored in the storage area 52 with the second identification code ID2 read and received from the storage area 62 of the engine control apparatus 22 in step S11.

In the updating process, specifically, the CPU 60 erases the old second identification code ID2 from the storage area 52 and writes (registers) the second identification code ID2 received from the engine control apparatus 22 in the storage area 52.

According to the registering or updating process, the second identification code ID2 stored in the storage area 52 of the theft prevention apparatus 18 becomes identical to the second identification code ID2 stored in the storage area 62 of the engine control apparatus 22.

In step S12, the CPU 60 displays a normal registration termination, and the process of registering or updating the second identification code ID2 is terminated.

If the second identification code ID2 has not been received in step S9 and the period of 300 ms has elapsed in step S10, then the CPU 60 judges that the registering process has not been performed normally, and the CPU 60 displays an abnormal registration termination in step S13. Then, the process of registering or updating the second identification code ID2 is terminated.

When the normal registration termination is displayed, the display lamp 38 displays the normal registration/updating by way of a light emission such as the emission of green light or the display of characters representing the normal registration/updating. When the abnormal registration termination is displayed, the display lamp 38 displays the abnormal registration/updating by way of a light emission such as the emission of red light or the display of characters representing the abnormal registration/updating.

In the embodiment, when the engine control apparatus 22 is replaced, the second identification code ID2 stored in the storage area 52 of the memory 48 of the theft prevention apparatus 18 is updated. However, as shown in a flowchart of FIG. 7, the second identification code ID2 stored in the storage area 62 of the memory 58 of the engine control apparatus 22 may be updated into the second identification code ID2 stored in the storage area 52 of the memory 48 of the theft prevention apparatus 18.

The process of registering or updating the second identification code in the engine control apparatus 22 will be described below with reference to FIG. 7. Steps S1 through S6 shown in FIG. 7 are identical to the corresponding steps shown in FIG. 6 and will not be described in detail below.

Figure 7:
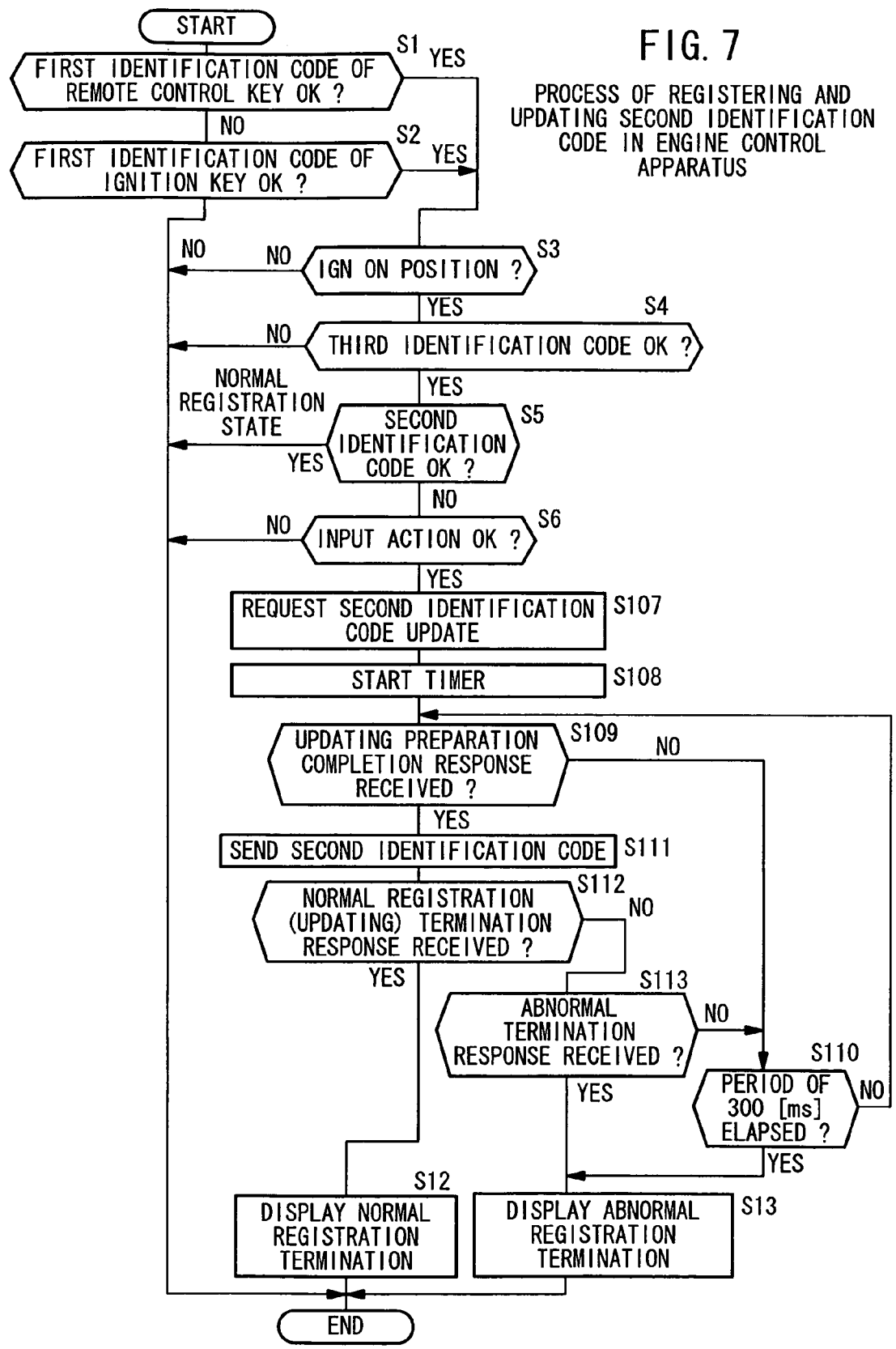
FIG. 7 is a flowchart of a process of registering or updating a second identification code in an engine control apparatus.

In step S107 shown in FIG. 7, the CPU 60 requests the engine control apparatus 22 to update the second identification code ID2 through the communication line 16.

The engine control apparatus 22 is requested to update the second identification code ID2 only after the third identification code ID3 is checked successfully in step S4 and the predetermined input action is made as the additional requirement in step S6. Therefore, the theft prevention capability of the theft prevention system is increased.

After the CPU 60 has requested the engine control apparatus 22 to update the second identification code ID2, the CPU 60 starts to activate a registration and updating monitoring timer for a predetermined period of 300 ms in step S108.

In step S109, the CPU 60 determines whether it has received a response indicating that the preparation for updating is completed from the engine control apparatus 22 or not.

If the CPU 60 has not received a response, then the CPU 60 continuously determines whether a response has been received from the engine control apparatus 22 or not until the period of 300 ms of the registration and updating monitoring timer elapses.

If the period of 300 ms has elapsed, then the CPU 60 judges that the registering process has not been performed normally, and the CPU 60 displays an abnormal registration termination in step S13. Then, the process of registering or updating the second identification code ID2 is terminated.

If the CPU 60 has received a response within the period in step S109, then the CPU 60 reads the second identification code ID2 stored in the storage area 52 and sends the read second identification code ID2 to the engine control apparatus 22 through the communication line 16 in step S111.

In step S112, the CPU 60 determines whether it has received a response from the engine control apparatus 22, indicating that the registration (updating) has been finished normally, or not.

If the CPU 60 has not received a normal termination response, then the CPU 60 determines whether it has received a response indicative of an abnormal termination of the registering process or not in step S113.

If the CPU 60 has not received an abnormal termination response, then the CPU 60 determines in step S110 whether the period of 300 ms of the registration and updating monitoring timer has elapsed or not. If the period of 300 ms has not elapsed, then the CPU 60 determines whether it has received an updating preparation completion response or not in step S109, sends the second identification code ID2 again in step S111, and determines again in step S112 whether a response from the engine control apparatus 22, indicating that the registration (updating) has been finished normally, has been received or not.

If the CPU 60 has not received a normal registration (updating) termination response in step S112, but has received an abnormal termination response in step S113, or if the CPU 60 has not received an abnormal termination response in step S113 but the period of 300 ms has elapsed in step S110, then the CPU 60 judges that the registering process has not been performed normally, and the CPU 60 displays an abnormal registration termination in step S13.

Then, the process of registering or updating the second identification code ID2 is terminated.

If the CPU 60 has received a normal registration (updating) termination response within the period of 300 ms in step S112, then the CPU 60 displays a normal registration termination in step S12, and the process of registering or updating the second identification code ID2 is terminated. In this case, the second identification code ID2 stored in the storage area 62 of the memory 58 of the engine control apparatus 22 is updated (rewritten) into the second identification code ID2 stored in the storage area 52 of the memory 48 of the theft prevention apparatus 18.

The process of registering or updating the second identification code ID2 stored in the storage area 52 of the memory 48 of the theft prevention apparatus 18 or the second identification code ID2 stored in the storage area 62 of the memory 58 of the engine control apparatus 22 has been described above.

A process of checking various identification codes (a code verifying process) for determining whether the engine is operated using the ignition key 14 and continued to be operated or whether the operated engine is to be stopped will be described below. The code verifying process is necessarily performed when the engine is operated, and has some steps overlapping those of the registering and updating process described above. Those overlapping steps will be described briefly below.

Figure 8:
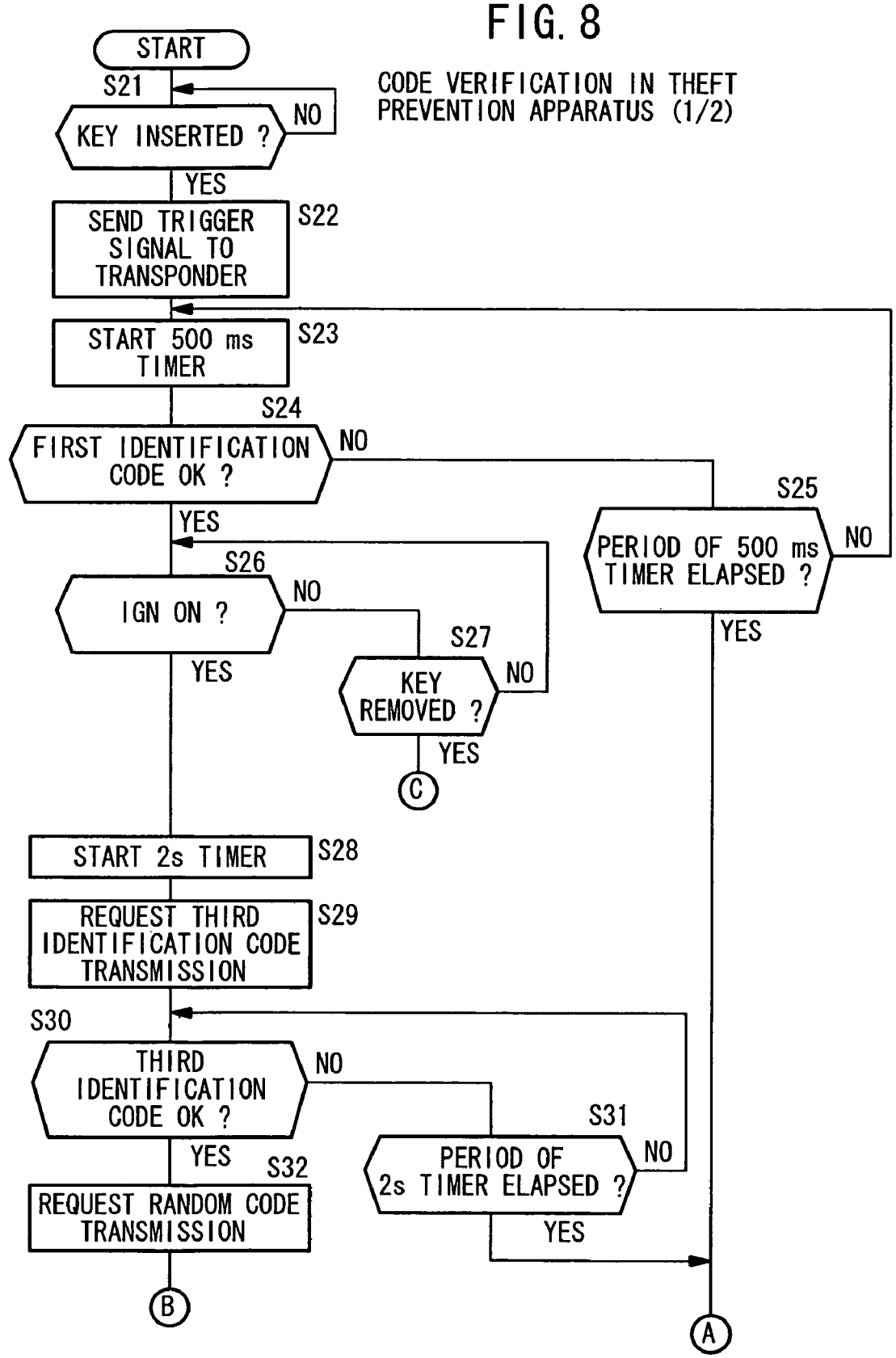
FIGS. 8 and 9 are a flowchart of a process of verifying an identification code in the theft prevention apparatus.
Figure 9:
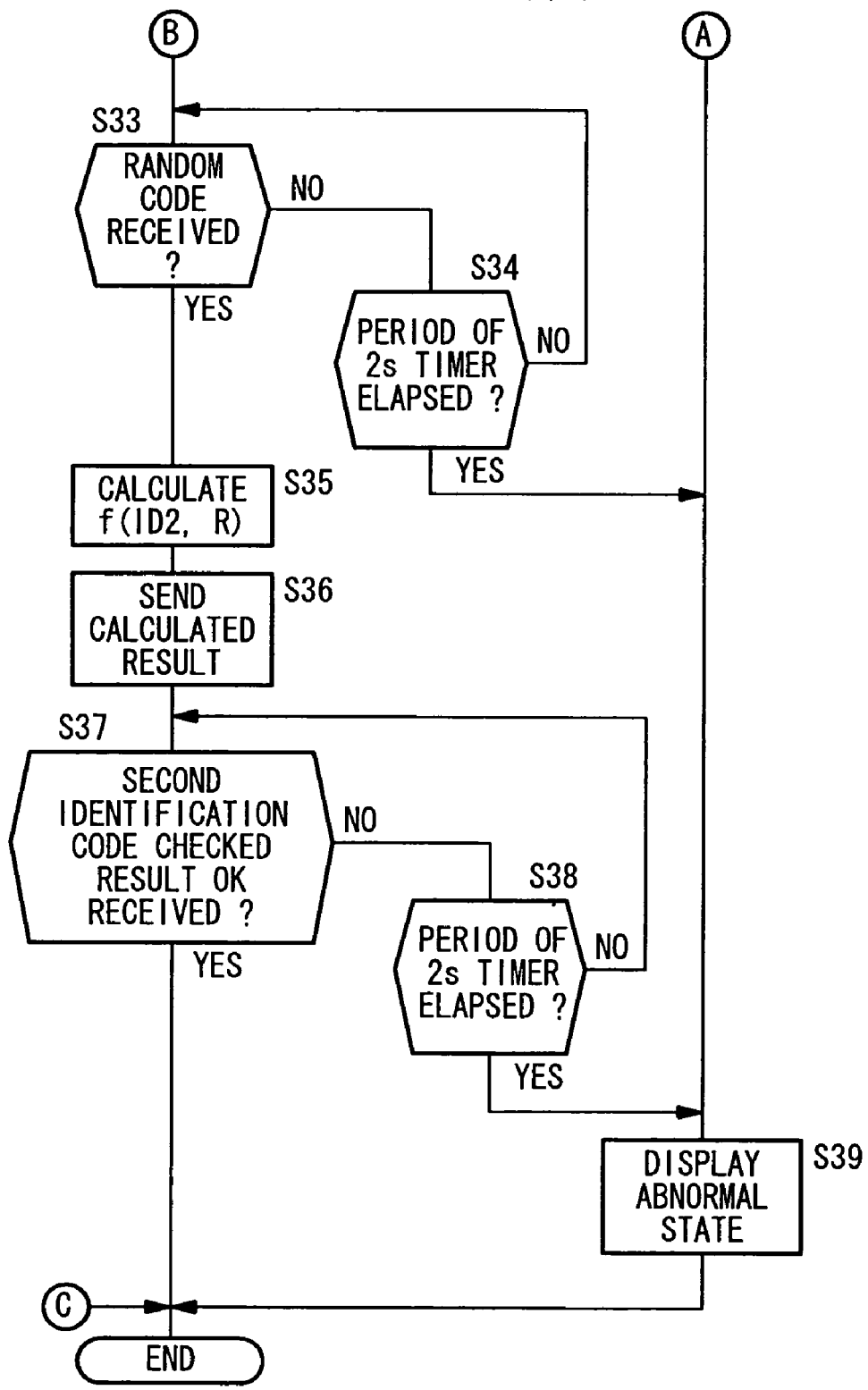
Figure 10:
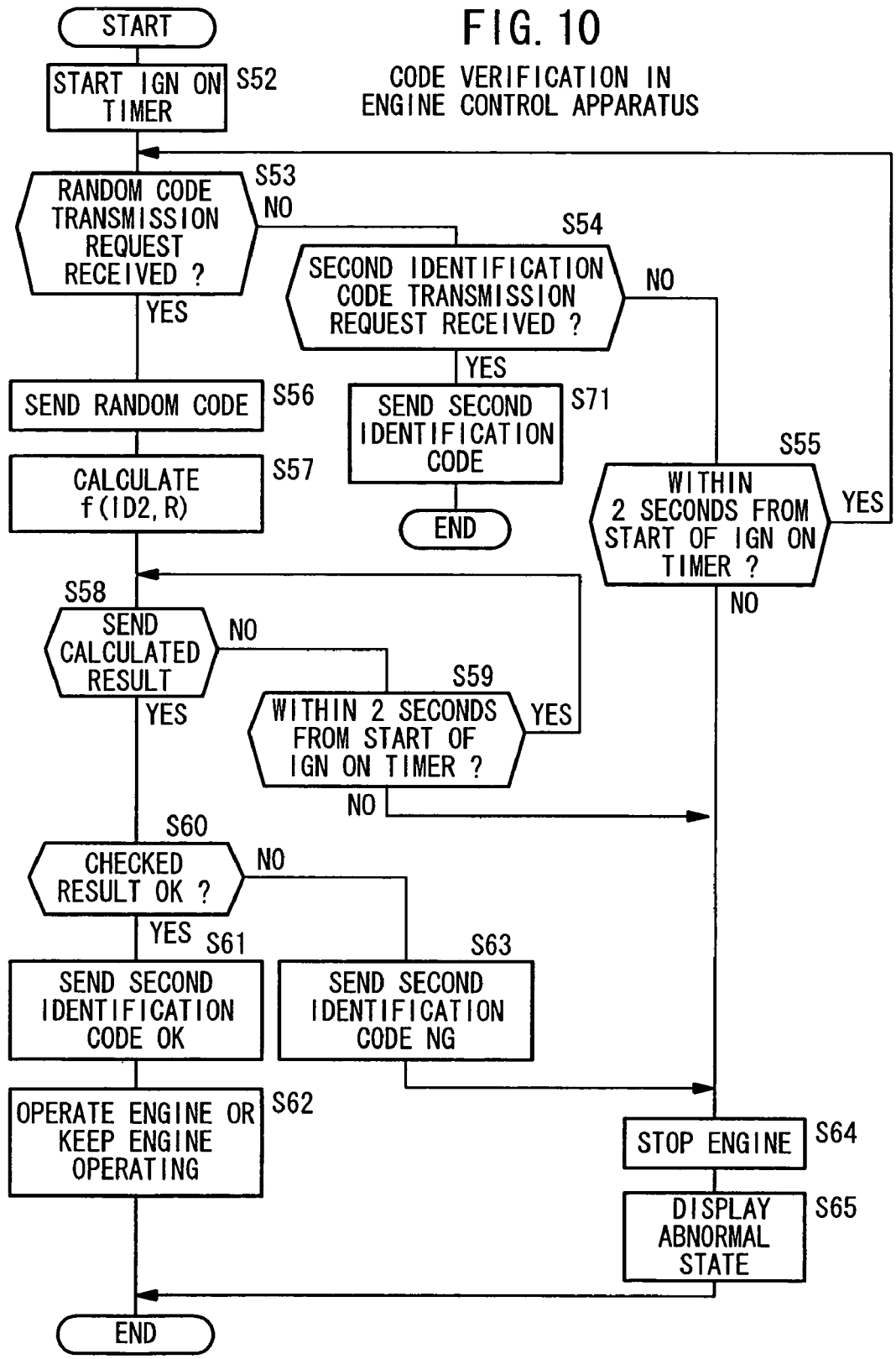
FIG. 10 is a flowchart of a process of verifying an identification code in the engine control apparatus.

FIGS. 8 and 9 are a flowchart of a code verifying program that is executed by the theft prevention apparatus 18, i.e., the CPU 60 thereof. FIG. 10 is a flowchart of a code verifying program that is executed by the non-illustrated CPU of the engine control apparatus 22. For the sake of brevity, the CPUs for executing the programs will be omitted from description unless the omission makes the description vague and indefinite.

In step S21, it is determined whether or not the ignition key 14 is inserted into the key cylinder 28 and the key insertion detecting switch 30 is turned on as detected by the key insertion detecting signal Sin. If it is detected that the key insertion detecting switch 30 is turned on, a trigger signal is sent to the transponder 33 incorporated in the ignition key 14 in step S22, verifying the ignition key 14 in the same manner as with step S2 described above. When the trigger signal is sent, a first identification checking time monitoring timer is started for a period of 500 ms.

Specifically, the theft prevention apparatus 18 sends a trigger signal from the coil antenna 41 in order to trigger the transponder 33 incorporated in the ignition key 14. When supplied with electric power by the trigger signal and energized thereby, the transponder 33 sends the first identification code ID1$t$ stored in the memory 32.

In steps S24, S25, the theft prevention apparatus 18 checks the first identification code ID1$t$ received from the transponder 33 against the first identification code ID1$t$ read from the storage area 51$t$ of the memory 48. If it is judged that the first identification codes ID1$t$ are identical to each other (OK) within the period of 500 ms after the transmission of the trigger signal, then control goes to step S26.

In step S26, it is determined whether the ignition key 14 is turned to the ignition-on (IGN ON) position or not based on the ignition switch signal Sig. If it is not judged that the ignition key 14 is turned to the ignition-on position, then it is determined whether the ignition key 14 is removed or not based on the key insertion detecting signal Sin in step S7. If it is judged that the ignition key 14 is removed, then the code verifying process is put to an end. Specifically, if it is judged that the ignition key 14 is removed from the key cylinder 28 without turning on the ignition switch 26 even when the first identification codes ID1$t$ are identical to each other in steps S24, S26, the immobilizer function is not canceled, but the code verifying program is ended as no malfunction has occurred.

If the ignition key 14 is turned to the ignition-on position in step S26, then a third identification code checking time monitoring time is started for a period of 2 s in step S28. Since the engine control apparatus 22 is supplied with electric power at this time, when the user turns the ignition switch 26 to the start position, the engine is operated by the igniter 71 and the fuel injector 72.

In step S29, the CPU 60 sends a third identification code transmission request signal for requesting the transmission of (reading) the third identification code ID3 to the memory 63 of the third apparatus 24 through the communication line 16.

In step S30, the third identification code ID3 read from the memory 63 and received through the communication line 16 based on the third identification code transmission request signal is checked against the third identification code ID3 read from the storage area 53 of the memory 48. If it is judged that the third identification codes ID3 are identical to each other (OK) within the period of 2 s in step S31, then control goes to step S32.

In step S32, the theft prevention apparatus 18 sends a random code transmission request signal for requesting the transmission of the random code R (random number) to the engine control apparatus 22 through the communication line 16 in order to check the second identification codes ID2 stored respectively in the theft prevention apparatus 18 and the engine control apparatus 22.

If the random code R is received through the communication line 16 within the period of 2 s in steps S33, S34, the received random code R and the second identification code ID2 read from the storage area 52 of the memory 48 are assigned to the verification code generating function f(A,x) stored in the storage area 54, producing a function value (calculated result) f(ID2,R). In step S35, the calculated result V (V=f(ID2,R)) is sent to the engine control apparatus 22 through the communication line 16.

Thereafter, the reception of the checked result over the second identification codes ID2 based on the function value f(ID2,R) from the engine control apparatus 22 through the communication line 16 is awaited in steps S37, S38. If a signal (OK) indicative of the agreement of the second identification codes ID2 is received within the period of 2 s, then it is judged that the immobilizer function is normally canceled, and the code identifying program is terminated.

In a first case where it is judged that the first identification codes ID1 are not identical to each other within the given period in step S24 and the period has elapsed in step S25, or a second case where it is judged that the third identification codes ID3 are not identical to each other within the given period in step S30 and the period has elapsed in step S31, or a third case where it is judged that the random code R is not received within the given period in step S33 and the period has elapsed in step S34, or a fourth case where it is judged a signal indicative of the agreement of the second identification codes ID2 is not received within the given period in step S37 and the period has elapsed in step S38, it is judged that the immobilizer function is not canceled due to a theft or a malfunction such as a failure, and an abnormal state is displayed by the display lamp 38 in step S39. The code verifying program is now put to an end.

If the period has elapsed in step S25 in the first case, then since the ignition switch 26 is not in the ignition-on position, the engine is not started. If the period has elapsed in steps S31, S34, S38 in the second through fourth cases while the engine has been started by turning the ignition switch 26 to the start position and operated by the igniter 71 and the fuel injector 72, then the engine is stopped by the engine control apparatus 22 as described later on. If the period has elapsed in steps S31, S34, S38 in the second through fourth cases, then the engine is not started even if the ignition switch 26 is turned to the start position.

The display lamp 38 may be replaced with a liquid crystal display unit or the like for displaying a reason why the immobilizer function has not been canceled, in step S39.

An identification code verifying process performed by the engine control apparatus 22 will be described below with reference to a flowchart shown in FIG. 10.

If the ignition switch 26 is turned to the ignition-on position (YES in step S26) after the first identification code ID1t from the ignition key 14 has been checked successfully (YES in step S24) in the code verifying process shown in FIGS. 8 and 9, then the engine control apparatus 22 is supplied with electric power from the battery 27 and carries out the identification code verifying process shown in FIG. 10.

After having been initialized, the engine control apparatus 22 starts activating an IGN ON timer for a period of 2 s in step S52. If the engine control apparatus 22 receives a random code transmission request signal or a second identification code transmission request signal from the theft prevention apparatus 18 through the communication line 16 within the period of 2 s of the IGN ON timer in step S54 while repeating a looped process in steps S53, S54, S55, then the engine control apparatus 22 reads the second identification code ID2 from the storage area 62 and sends the read second identification code ID2 to the theft prevention apparatus 18 through the communication line 16 in step S71.

If the random code transmission request signal is received within the period of the IGN ON timer in step S53, then the random number generator 65 generates a random number and sends the generated random number to the theft prevention apparatus 18 through the communication line 16 in step S56. In step S57, the random code R representing the generated random number and the second identification code ID2 read from the storage area 62 of the memory 58 are assigned to the verification code generating function f(A,x) stored in the storage area 61, producing a function value (calculated result) f(ID2,R). The function f(A,x) stored in the engine control apparatus 22 and the function f(A,x) stored in the theft prevention apparatus 18 are identical to each other.

Thereafter, if the calculated result V (V=f(ID2,R)) is received from the theft prevention apparatus 18 within the period of the IGN ON timer in steps S58, S59, then it is determined whether the received function value f(ID2,R) is identical to the calculated function value f(ID2,R) in step S60. If the function values f(ID2,R) are identical to each other, then the engine control apparatus 22 sends a second identification code OK signal indicating that the second identification codes ID2 are identical to each other to the theft prevention apparatus 18 in step S61. In step S62, the engine is allowed to be operated. In this case, if the engine has been started by turning the ignition switch 26 to the start position and operated by the igniter 71 and the fuel injector 72 after the IGN ON timer is started in step S52, the operation of the igniter 71 and the fuel injector 72 is continued, thereby continuously operating the engine.

If the function values f(ID2,R) are not identical to each other in step S60, then the engine control apparatus 22 sends a second identification code NG signal indicating that the function values f(ID2,R) are not identical to each other to the theft prevention apparatus 18, making the engine inoperable in steps S63, S64. Since the engine is made inoperable in step S64, even if the engine has been made operable after step S52, the engine is stopped.

Specifically, according to the identification code verifying process shown in FIG. 10, in a first case where the request for transmitting the random code R and the request for transmitting the second identification code ID2 are not received within the given period in steps S53, S54, S55, or a second case where the ignition switch 26 is turned to the ignition-on position and thereafter the calculated result V is not received within the given period in steps S58, S59, or a third case where the second identification codes ID2 are not identical to each other in steps S60, S63, if the engine has been started by turning the ignition switch 26 to the start position and operated by the igniter 71 and the fuel injector 72 after the IGN ON timer is started in step S52, the engine is stopped in operation in step S64, and an abnormal state is displayed by the display lamp 38 in step S65. The identification code verifying process is now put to an end. If negative results are obtained in steps S55, S59, S60, then the engine is not started even if the ignition switch 26 is turned to the start position.

As described above, the theft prevention system 10 is connected by a wireless link to the remote control key 12 which stores the first identification code ID1r and the ignition key 14 which stores the first identification code ID1t. The theft prevention system 10 has the theft prevention apparatus 18 which stores the first through third identification codes ID1 (ID1r, ID1t), ID2, ID3, the engine control apparatus 22 which is connected to the theft prevention apparatus 18 through the communication line 16 and stores the second identification code ID2, and the third apparatus 24 which is connected to the theft prevention apparatus 18 through the communication line 16 and stores the third identification code ID3.

The theft prevention apparatus 18 has a permitting means (primarily the function of step S4 of the CPU 60) for checking the first identification codes ID1 (ID1r, ID1t) sent from the portable unit (the remote control key 12 or the ignition key 14), checking the third identification code ID3 received from the third apparatus 24 through the communication line 16, and permitting the theft prevention apparatus 18 or the engine control apparatus 22 to register or update the second identification code ID2 based on the checked results over the first identification codes ID1 (ID1r, ID1t) and the third identification code ID3, and an equalizing means (primarily the function of step S9 of the CPU 60) for equalizing the information of the second identification codes ID2 stored in the theft prevention apparatus 18 and the engine control apparatus 22 when the permitting means permits the theft prevention apparatus 18 or the engine control apparatus 22 to register or update the second identification code ID2.

For registering or updating the information of the second identification codes ID2 stored in the theft prevention apparatus 18 and the engine control apparatus 22 when the theft prevention apparatus 18 or the engine control apparatus 22 is replaced, the third identification code ID3 sent from the third apparatus 24 which is mounted in the motor vehicle and connected to the theft prevention apparatus 18 through the communication line 16 must be identical to the third identification code ID3 stored in the storage area 53 of the theft prevention apparatus 18. Therefore, even if a third party prepares and installs a portable unit (the remote control key 12 or the ignition key 14) and a theft prevention apparatus 18 of its own on the motor vehicle, the third identification code ID3 is not verified, and hence the condition in step S4 is not satisfied. Accordingly, the information of the second identification codes ID2 cannot be equalized to each other. The theft prevention system 10 is thus effective to make the motor vehicle highly resistant to attempts to steal the motor vehicle. In addition, when an authorized party wants to equalize the information of the second identification codes ID2 to each other, the information of the second identification codes ID2 can be equalized to each other within a short period of time. Thus, the theft prevention system 10 is highly convenient to use.

The operation switch 44 is disposed in a vehicle cabin of the motor vehicle for detecting an input action on a manually operable operation unit. For registering or updating the information of the second identification code ID2, it is necessary to make an input action on the operation unit such as a parking brake in the vehicle cabin, as an additional requirement. Consequently, the motor vehicle is prevented from being stolen by a third party who is not aware of such an input action. The motor vehicle is thus highly resistant to being stolen.

The operation unit is a parking brake or a brake pedal, and the input action made on the operation unit is an action to stop the motor vehicle or to keep the motor vehicle at rest. The motor vehicle is thus highly resistant to being stolen as it is cannot be moved when the input action is made on the operation unit. Specifically, when the motor vehicle is attacked, since the input action made on the operation unit acts to make the motor vehicle immovable, the motor vehicle is highly resistant to being stolen.

The third apparatus 24 is located in a space which is difficult to access, for example, behind the meter unit 36 mounted in the dashboard 70, i.e., the space 78 from which the third apparatus 24 cannot be removed unless the meter panel 74 and the meter unit 36 are removed. Alternatively, the third apparatus 24 is integrally mounted in the fuse box 82 and positioned in the space 88 from which the third apparatus 24 cannot be removed unless the harness 84 is removed. Consequently, the third apparatus 24 is considerably difficult and time-consuming to remove, and is further time-consuming to reinstall after being removed. Thus, the third apparatus 24 makes the motor vehicle highly resistant to being stolen. An authorized person does not need to remove the third apparatus 24, and the third apparatus 24 is essentially free of failures as it includes a memory. Actually, since the registering and updating process is performed through the single communication line 16 to which the third apparatus 24 is connected, an ignition key 14 and a theft prevention apparatus 18 which may have been prepared in advance by a malicious third party are unable to acquire the third identification code ID3 stored in the third apparatus 24 and hence cannot register the third identification code ID3. Thus, the motor vehicle is made highly resistant to being stolen.

In the above embodiment, the third identification code ID3 is required for the code verification in the theft prevention apparatus 18. However, the theft prevention system may be modified such that the third identification code ID3 is not required for the code verification by deleting steps S28, S29, S30 shown in FIG. 8.

Although a certain preferred embodiment of the present invention has been shown and described in detail, it should be understood that various changes and modifications may be made therein without departing from the scope of the appended claims.

What is claimed is:

1. A theft prevention system for a motor vehicle, comprising:
    a theft prevention apparatus connected through a wireless link to a portable unit storing a first identification code, and storing first, second, and third identification codes;
    an engine control apparatus connected to said theft prevention apparatus through a communication line and storing a second identification code; and
    a third apparatus connected to said theft prevention apparatus through said communication line and storing a third identification code;
    said theft prevention apparatus comprising:
        permitting means for checking the first identification code sent from said portable unit, checking the third identification code received from said third apparatus through said communication line, and permitting said theft prevention apparatus or said engine control apparatus to register or update the second identification code based on checked results over the first identification code and the third identification code; and
        equalizing means for equalizing information of the second identification codes stored in said theft prevention apparatus and said engine control apparatus when said permitting means permits said theft prevention apparatus or said engine control apparatus to register or update the second identification code.

2. A theft prevention system according to claim 1, further comprising:
    detecting means disposed in a vehicle cabin of the motor vehicle for detecting an input action made on a manually operable operation unit;
    wherein said permitting means permits said theft prevention apparatus or said engine control apparatus to register or update the second identification code based on a detected result from said detecting means if the first identification code and the third identification code are verified.

3. A theft prevention system according to claim 2, wherein said manually operable operation unit comprises a parking brake or a brake pedal of the motor vehicle.

4. A theft prevention system according to claim 1, wherein said third apparatus is disposed in a location in the motor vehicle from which said third apparatus is hardly removable.

5. A theft prevention system according to claim 4, wherein said location is a space behind a meter unit mounted in a dashboard of the motor vehicle and positioned inside of a front windshield of the motor vehicle.

* * * * *